Patented May 11, 1954

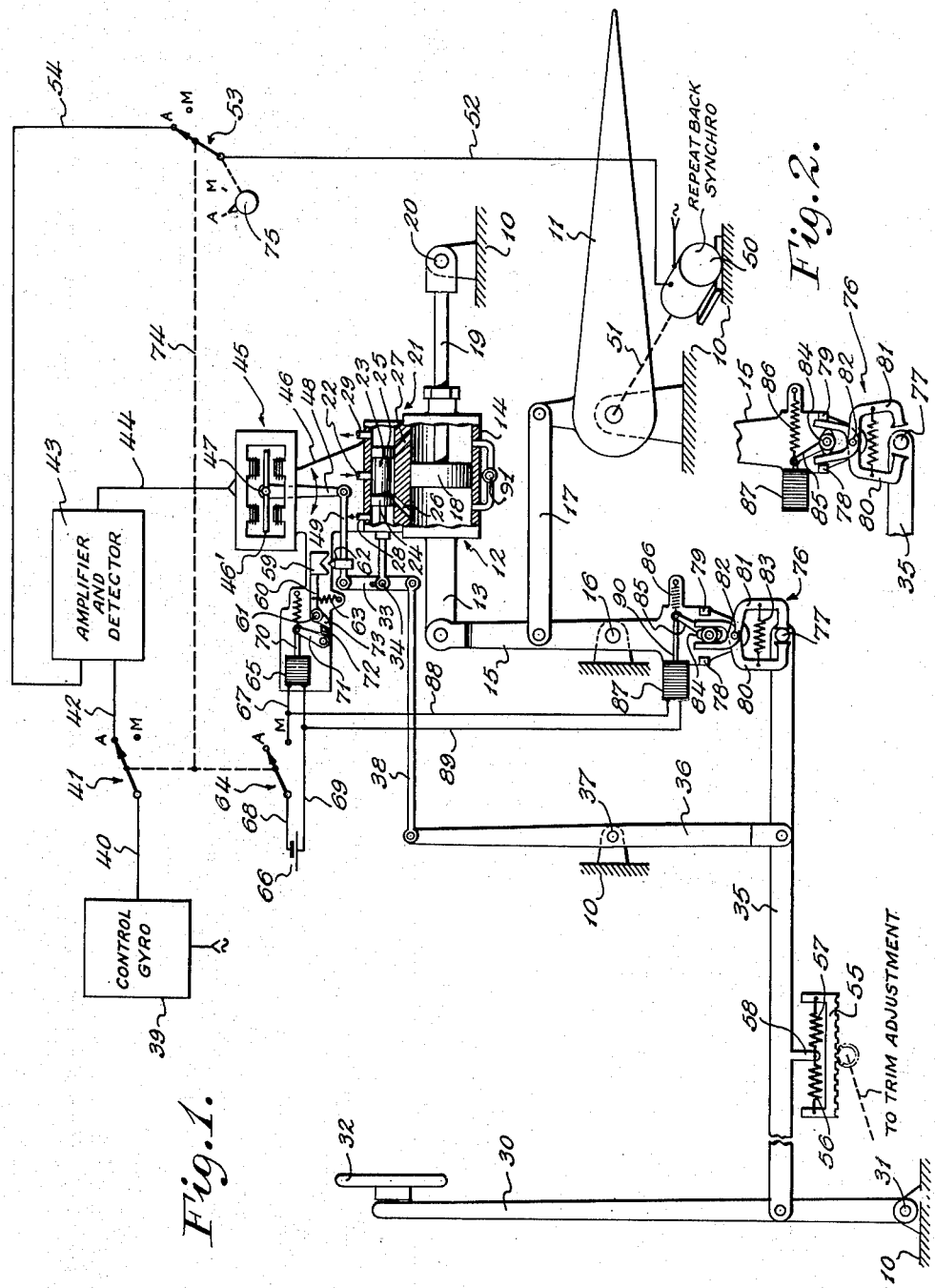

2,678,177

UNITED STATES PATENT OFFICE 2,678,177

MANUAL BOOSTER AND AUTOMATIC PILOT SERVO SYSTEM

Peter J. Chenery, Pelham, and John C. Newton, Roslyn Heights, N. Y., assignors to The Sperry Corporation, a corporation of Delaware Application December 13, 1951, Serial No. 261,502

18 Claims. (Cl. 244—76)

This invention relates to a manual booster and automatic pilot servo system for dirigible craft. In the practical embodiment of the invention shown in the drawing, the improved system is illustratively depicted as employed on an aircraft in which the power motor of the system is operatively connected to a steering member such as the craft's elevator surfaces.

One of the objects of the present invention is to provide a system utilizing manual and automatic control for the steering member of a dirigible craft in which a single power motor performs a booster function for each of the controls and in which the effective automatic control can be overridden by the manual control.

Another object is to provide a system of the described character in which the manual and automatic control function are also usable alternatively.

One of the features of the invention resides in the combination in the system of an additional servomotor for the automatic pilot thereof.

A further feature of the invention is provided by a two position settable device in the mechanical repeat back connection for the power motor. Switching means settable in automatic pilot or manual control positions is effective to determine the corresponding setting of the settable device. In the automatic pilot position, the device is set to permit limited yielding in the repeat back connection to the manual controller to facilitate manual override of the automatic pilot controller. In the manual position, the device functions to provide initial freedom of the manually operable control member without restraint.

Other objects, features and structural details of the invention will be apparent from the following description when read in relation to the accompanying drawing in which:

Fig. 1 is a diagrammatic view showing the mechanical and electrical components forming the improved system and the circuitry for the related electrical parts, and Fig. 2 is a detail view of the settable device in the repeat back connection showing the same positioned to accommodate manual control of the system.

With reference to the drawing, the relatively fixed locations of the frame of a dirigible craft employing the improved servo system are indicated at 10. The element corresponding to the steering member for the craft is designated at 11. Member 11 may be the elevator control surfaces for an aircraft that are movable to change the attitude of the craft about its pitch axis.

As shown, member 11 is pivotally mounted on a portion of the fixed frame 10 of the craft, the same being operatively connected to the power motor 12 of the system by way of a rod 13 extending from one end of the housing 14 of the motor 12, a rocker arm 15 connected at one end to the rod 13 and pivotally mounted to the fixed frame of the craft as indicated at 16, and an interconnecting link 17 between the member 11 and rocker 15. The power motor 12 shown is an hydraulic servo of a conventional type in which the cylindrical housing is mounted to move relative to a fixed piston 18 whose rod 19 extends exteriorly of the housing 14 and is pivotally anchored to the frame 10 of the craft as designated at 20.

The element corresponding to the means for operating the power motor 12 may be provided, as shown by a conventional spool type balanced valve designated at 21 that is supplied with fluid at a constant high pressure from a suitable fluid pump source (not shown) by way of intake pipe 22. Valve 21 is of such character that the power motor 12 operates at a velocity that is substantially proportional to the displacement of the valve spool 23 from its neutral position in which the lands 24, 25 of the valve cover the ports 26, 27, controlling passage of the fluid to and exhaust of the fluid from the power motor 12. The exhaust pipes for the valve 21 are indicated at 28 and 29, the same returning the fluid from the motor 12 to a suitable sump (not shown). The housing for the valve 21 as shown may be formed as a part of the housing of the power motor 12 so that these elements of the system move as a unit. With movement of valve spool 23 to the right as viewed in the drawing, high pressure fluid from pipe 22 is admitted to the portion of the cylindrical housing 14 of the motor 12 to the right of piston 18 by way of port 27. At the same time, the fluid to the left of the piston 18 is connected to the sump by way of port 26 and pipe 28. The power motor housing 14 together with the control valve housing is consequently urged to the right to follow the movement of the valve spool 23 until port 27 is covered by land 25 and port 26 is covered by land 24. The power motor, when so operated, urges the rocker 15 in a clockwise direction about pivot 16 and through link 17 provides down elevator. A reversal of the initial movement of the valve spool 23 from its neutral position will result in a reversal in the described operation and cause the power motor to provide up elevator.

The system further includes a manually operable control member indicated in the present instance by a steering element 30 in the form of a lever pivotally mounted at 31 to the fixed frame 10 of the craft. The wheel 32 at the top of the rock lever 30 provides a gripping part from which the member may be rocked about its axis 31 by manual effort. As shown herein, an input connection is provided between the lever 30 and the balanced valve 21 providing the means for operating the power motor 12. A further input connection is provided for the valve 21 from the servomotor of the automatic pilot means as hereinafter described. The valve 21 has a single input obtained in the arrangement shown from a linkage mechanism in the form of a differential rocker 33 pivotally connected at 34 to the extending end of the valve spool 23 of the power motor control means. The input connection between element 30 and the linkage mechanism includes link 35, rocker 36 pivotally mounted at 37 to the fixed frame 10 of the craft, and link 38 connected to one of the ends of the rocker 33.

The improved system further includes automatic pilot means for controlling the steering member 11. As herein diagrammatically shown, such means may include a control gyro designated at 39. This may be, for example, a conventional gyro vertical with a known A. C. pickoff (not shown) such as a selsyn type transmitter providing a signal in accordance with departure of the craft from a reference position about its athwartships or pitch axis. The signal from the gyro control element 39 is fed by way of lead 40, through an off-on switch 41, and lead 42 to a suitable amplifier and detector element designated diagrammatically at 43. The D. C. output of the element 43 is fed by way of lead 44 to the windings of the automatic pilot servomotor indicated at 45. As herein shown, the servomotor 45 is a compound electrical D. C. torque motor of the character described and shown in U. S. Letters Patent No. 2,426,608, issued September 2, 1947, to P. Halpert et al. The pole providing magnetic stator element of motor 45 is fixedly mounted on a plate 46 connected to the balanced valve 21 and power motor 12 assembly. The movable element or armature 46' of the servomotor 45 is rockably mounted at 47 on plate 46 for limited movement in the gaps between the pole faces of the stator element of the servomotor. Lever arm 48 adapted to move with movement of the armature 46' is operatively connected to rocker 33 through an input connection or link 49. As shown, link 49 is connected to rocker 33 above its pivot 34 and link 38 is connected to rocker 33 below its pivot 34 so that the valve spool 23 is operated by both the manually operable control means 30 and the automatic pilot servomotor 45. The automatic pilot means may also include a repeatback means providing a signal in accordance with the displacement of the steering member 11 or elevator from a null condition. Such means may be provided as herein shown by a repeatback synchro or electrical selsyn transmitter 50 whose stator is fixed to the craft and whose rotor is adapted to move with movement of member 11 by a connection therebetween such as shaft 51. The repeatback signal from synchro 50 is fed back to the amplifier and detector element 43 in opposition to the input signal to element 43 from the control gyro 39. This feedback may be accomplished by way of lead 52, off-on switch 53 and lead 54.

Spring centering means are provided for the manually operable control member 30 to maintain the feel of the operators control on the steering member in the booster system. As shown, such artificial feel device may comprise a bracket 55 with two opposed springs 56 and 57 thereon connected to an extending arm 58 from link 35. Bracket 55, as shown, is movably mounted relative to fixed frame 10 of the craft so as to facilitate a trim adjustment thereof by the pilot of the craft as shown and described in U. S. Letters Patent No. 2,227,375 issued December 31, 1940, to B. G. Carlson. The trim adjustment required for the condition of operation of the craft may be made by the pilot through a means including a suitable shaft and gear and rack arrangement, as shown.

The improved system further includes means for centering the input connection between the automatic pilot servomotor 45 and the power motor operating means provided by valve 21. As herein shown, such centering means may include a centering piece 59 having a tapered surface situated at the end of a lever arm 60 pivoted at 61 on an extension of the plate 46 and a cooperating lug 62 fixed to link 49 having a wedge shaped tip. Spring 63 is effective when the system is set for manual operation to force the centering piece 59 on the tapered end of the lug to urge link 49 in the proper direction to center the link 49, i. e., the position the link would assume with a null input to the servomotor 45 of the automatic pilot means. The system also includes a switching device or means that is settable in automatic pilot or manual position. Such a means is indicated by the on-off switch 64. Means controlled by the switch for operating the centering means include a solenoid 65 energized from battery 66 when switch 64 is closed through a closed circuit including lead 67, switch 64, lead 68, battery 66, lead 69 and the winding of the solenoid. The spring restrained armature 70 is then effective to rock the lever 71 to disengage the cam 72 on lever 71 and cam 73 on arm 60. The arm 60 is then urged by spring 63 to engaging relation with lug 62 to center the link 49. The means for disabling the centering means controlled by the switching device or means 64 includes spring restrained armature 70, lever 71 and the cooperating cams 72 and 73 which are effective to urge arm 60 in a counterclockwise direction to the position in which it is shown in Fig. 1. In the drawing, the automatic and manual positions of the two position switches 64, 53 and 41 are respectively indicated by the designations (A) and (M). As shown, the arms of the respective switches 64, 53 and 41 are interconnected by suitable mechanical connections 74 so that the same may be set by a common knob designated at 75 in relation to switch 53.

The improved servo system also includes a repeatback connection between the power motor 12 and the input connection or link 38 operated by the manual control member 30. The repeatback connection shown in Fig. 1 is provided by rocker arm 15 connected to the power motor 12, a settable device or means designated at 76 situated at the opposite end of the rocker 15, and an extension of link 35 having a pin 77 located on the end thereof. Device 76, as shown, includes two limit stops 78, 79 defined by bosses on rocker 15, and a pair of tong elements 80 and 81 pivoted to the rocker 15 as indicated at 82. A spring 83 interconnects the lower legs of the tong elements and with knob 75 set for automatic pilot operation, the spring yieldingly engages the respective ends of the tong elements and the pin 77 as shown in Fig. 1. In automatic pilot position, the spring 83 also urges the upper legs of the tong elements 80, 81 to a relatively closed condition with respect to a cam member 84 situated therebetween and pivotally mounted on rocker 15. Cam member 84 is maintained in the position shown in Fig. 1 representing the automatic pilot position of the servo system by a lever 85 connected to the cam member and a spring 86 anchored to the rocker 15. The means controlled by the switching device or means 64 for changing the setting of the settable device 76 to provide manual operation of the servo system in exclusion of the automatic pilot includes solenoid 87 whose winding is parallel connected to leads 67, 69 by way of leads 89, 88. The armature 90 of solenoid 87 is connected to lever 85, the same moving lever 85 and cam member 84 to the positions shown in Fig. 2 when switch 64 is closed or set in the (M) position. This spreads the upper legs of the tong elements 80 and 81. The spring 83 is stretched in this operation to permit initial clearance or freedom between the pin 77 and the lower ends of the tong elements. The automatic pilot position defined by the device 76 provides yielding restraint in the repeatback connection to member 30 by which it is possible to effect manual operation of the servo system by overriding the automatic pilot means without disabling the same.

The second or manual setting of device 76 separates rocker 15 and link 35 to allow sufficient play in the manual control member 30 for the pilot to start the booster system in operation. In this second or manual position, the device 76 provides initial freedom without restraint in the repeatback connection.

In manual operation of the booster servo system, knob 75 is set in the (M) position, the switch 53 is opened so that the automatic pilot repeatback means is rendered ineffective, switch 41 is opened so that there is no signal input to amplifier-detector unit 43 from the control gyro 39, and switch 64 is closed so that link 49 is held in centered position and device 76 is set in manual position with its parts in the condition shown in Fig. 2. Counterclockwise movement of member 30 results in a clockwise movement of rocker 36 which reflects in motion of the spool 23 of the balanced valve 21 to the right as viewed in Fig. 1 and corresponding operation of the power motor to provide down elevator.

In automatic pilot operation, the parts are positioned as shown in Fig. 1, the automatic pilot functioning through servomotor 45 and input connection 49 to operate the power motor 12 so that the elevator is positioned with zero input to the amplifier and detector unit 43. Through the mechanical repeatback connection, the control member 30 is caused to follow the operations of the servo system effected through the automatic pilot means. The yielding device 76 in the mechanical repeatback connection to the valve 21 permits the automatic pilot means to be overriden by the manual control member 30. In such operation, knob 75 is left in the (A) position and the booster servo system is operated as described for manual operation through movement of the member 30 and its positioning of valve spool 23 of valve 21 through link 35, rocker 36, link 38 and rocker 33 as permitted by the yielding connection 76. When the system is operating under control of the automatic pilot means, the ratios of the selected spring restraints provided by springs 83 of device 76 and springs 56 and 57 of the artificial feel device determines the desired range of operation of the steering member 11 responsive to an operating signal from the control gyro 39. For a particular trim adjustment of the spring feel device, the linear springs 56—57 simulate the air load on member 11 for the pilot within the range of operation of the control surface member. The movement of stick or member 38 corresponds to the movement of surface 11. With no manual effort on the feel device and the system operating under automatic pilot control, the force necessary to deflect springs 56, 57 is supplied by spring 83. When the spring force supplied by spring 83 is equal and opposite the spring force 56, 57, then any further effort of the automatic pilot means to deflect control member or surface 11 further will result in an opening of the tongs 80, 81 of the device 76 to limit the extent of movement of surface 11 as desired. This is accomplished by nullification of the automatic pilot means control input signal through link 49 effective through the mechanical repeatback connection including link 35, rocker 36 and link 38. Assuming the spring 83 as capable of exerting a maximum chosen force and springs 56, 57 as capable of resisting more than the maximum force of the spring 83, spring 83 is effective to transmit the motion of member 11 through link 17, rocker 15, device 76, and link 35 to move lever 30 and rocker 36 until the force of the spring 83 is balanced by the restraining force of springs 56, 57. At such point, the tongs 80, 81 of device 76 open. The motion communicated through rocker 36 and link 38 to rocker 33 then ceases. In normal automatic pilot operation, the lower pivot point of the rocker 33 follows the motion of the power motor housing 14. When such following motion ceases by reason of the opening of the tongs of settable device 76, the valve spool 23 is effective to limit the operation of the power motor 12. Device 76 provides a spring controlled disengageable connection in the repeatback between the power motor 12 and the input connection to valve 21 from manual member 30. The arrangement and relative restraints provided by the described spring centering means and the spring controlled disengageable connection is such that the disengageable connection becomes disengaged to effect the desired limitation of operation of the power motor.

The system is effective to enable the steering member or surface 11 to be operated manually when the power motor 12 is disabled. In such an event the switch knob 75 is set in the (M) position and the safety valve 91 connecting the opposite sides of the power motor cylinder is opened. Direct operation of the surface 11 from member 30 is obtained by way of link 35, pin 77, device 76, rocker 15 and link 17.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. In a dirigible craft having a steering member, a manual booster and automatic pilot servo system including in combination, a power motor connected to operate the steering member, a manually operable control member, automatic pilot means including a servomotor, means for operating said power motor, a first input connection between said manually operable control member and said power motor operating means, a second input connection between the servomotor of said automatic pilot means and said power motor operating means, a switching device settable in automatic pilot or manual position, means for centering the second input connection to said power motor operating means, and means controlled by said switching device when set in manual position for operating said centering means.

2. In a dirigible craft having a steering member, a manual booster and automatic pilot servo system including in combination, a power motor connected to operate the steering member, a manually operable control member, automatic pilot means including a servomotor, means for operating said power motor, a first input connection between said manually operable control member and said power motor operating means, a second input connection between the servomotor of said automatic pilot means and said power motor operating means, a switching device settable in automatic pilot or manual position, means for centering the second input connection to said power motor operating means, and means for disabling said centering means controlled by said switching device when set in automatic pilot position.

3. In a dirigible craft having a steering member, a manual booster and automatic pilot servo system including in combination, a power motor connected to operate the steering member, a manually operable control member, automatic pilot means including a servomotor, means for operating said power motor, a first input connection between said manually operable control member and said power motor operating means, a second input connection between the servomotor of said automatic pilot means and said power motor operating means, a repeatback connection between the power motor and the manually operable control member, and a yielding device having limits in said repeatback connection facilitating manual override of said automatic pilot means.

4. In a dirigible craft having a steering member, a manual booster and automatic pilot servo system including in combination, a power motor connected to operate the steering member, a manually operable control member, automatic pilot means including a servomotor, means for operating said power motor, a first input connection between said manually operable control member and said power motor operating means, a second input connection between the servomotor of said automatic pilot means and said power motor operating means, a repeatback connection between the power motor and the manually operable control member, a settable device with limits in the repeatback connection having an override yielding position and a second position providing initial freedom without restraint, switching means settable in automatic pilot or manual position, and means controlled by said switching means for setting said device in the override position when the switching means is set in the automatic pilot position.

5. In a dirigible craft having a steering member, a manual booster and automatic pilot servo system including in combination, a power motor connected to operate the steering member, a manually operable control member, automatic pilot means including a servomotor, means for operating said power motor, a first input connection between said manually operable control member and said power motor operating means, a second input connection between the servomotor of said automatic pilot means and said power motor operating means, a repeatback connection between the power motor and the manually operable control member, a settable device with limits in the repeatback connection having an override yielding position and a second position providing initial freedom without restrain, switching means settable in automatic pilot or manual position, and means controlled by said switching means for setting said device in the second position when the switching means is set in the manual position.

6. In a dirigible craft having a steering member, a manual booster and automatic pilot servo system including in combination, a power motor connected to operate the steering member, a power motor connected to operate the steering member, a manually operable control member, automatic pilot means including a servomotor, means for operating said power motor, a first input connection between said manually operable control member and said power motor operating means, a second input connection between the servomotor of said automatic pilot means and said power motor operating means, a switching device settable in automatic pilot or manual position, means for centering the second input connection, a repeatback connection between the power motor and the manually operable control means, settable means with limits in the repeatback connection having an override yielding position and a second position providing initial freedom without restraint, and means controlled by said switching device when set in manual position for operating said centering means and for setting said settable means in said second position.

7. In a dirigible craft having a steering member, a manual booster and automatic pilot servo system including in combination, a power motor connected to operate the steering member, a manually operable control member, automatic pilot means including a servomotor, means for operating said power motor, a first input connection between said manually operable control member and said power motor operating means, a second input connection between the servomotor of said automatic pilot means and said power motor operating means, a switching device settable in automatic pilot or manual position, means for centering the second input connection, a repeatback connection between the power motor and said manually operable control means, settable means with limits in the repeatback connection having an override yielding position and a second position providing initial freedom without restraint, means for disabling said centering means controlled by said switching device when set in automatic pilot position, and means controlled by said switching device when set in automatic pilot position for setting said settable means in said override yielding position.

8. In a dirigible craft having a steering member, a manual booster and automatic pilot servo system including in combination, a power motor connected to operate the steering member, a manually operable control member, automatic pilot means including a servomotor, means for operating said power motor, a differential rocker providing an input to said power motor operating means, a first input connection to said differential rocker operatively connected to said automatic pilot servomotor, a second input connection to said differential rocker operatively connected to said manually operable control means, a switching device settable in automatic pilot or manual position, means for centering said first input connection, and means controlled by said switching device when set in manual position for operating said centering means.

9. In a dirigible craft having a steering member, a manual booster and automatic pilot servo system including in combination, a power motor connected to operate the steering member, a manually operable control member, automatic pilot means including a servomotor, means for operating said power motor, a differential rocker providing an input to said power motor operating means, a first input connection to said differential rocker operatively connected to said automatic pilot servomotor, a second input connection to said differential rocker operatively connected to said manually operable control means, a switching device settable in automatic pilot or manual position, means for centering said first input connection, and means for disabling said centering means controlled by said switching device when set in automatic pilot position.

10. In a dirigible craft having a steering member, a manual booster and automatic pilot servo system including in combination, a power motor connected to operate the steering member, a manually operable control member, automatic pilot means including a servomotor, means for operating said power motor, a differential rocker providing an input to said power motor operating means, a first input connection to said differential rocker operatively connected to said automatic pilot servomotor, a second input connection to said differential rocker operatively connected to said manually operable control means, a repeatback connection between said power motor and said second input connection, and a yielding device having limits in said repeatback connection permitting manual override of said automatic pilot means.

11. In a dirigible craft having a steering member, a manual booster and automatic pilot servo system including in combination, a power motor connected to operate the steering member, a manually operable control member, automatic pilot means including a servomotor, means for operating said power motor, a differential rocker providing an input to said power motor operating means, a first input connection to said differential rocker operatively connected to said automatic pilot servomotor, a second input connection to said differential rocker operatively connected to said manually operable control means, a repeatback connection between said power motor and said second input connection, a settable device with limits in the repeatback connection having an override yielding position and a second position providing initial freedom without restraint, switching means settable in automatic pilot or manual position, and means controlled by said switching means for setting said device in the override position when the switching means is set in the automatic pilot position.

12. In a dirigible craft having a steering member, a manual booster and automatic pilot servo system including in combination, a power motor connected to operate the steering member, a manually operable control member, automatic pilot means including a servomotor, means for operating said power motor, a differential rocker providing an input to said power motor operating means, a first input connection to said differential rocker operatively connected to said automatic pilot servomotor, a second input connection to said differential rocker operatively connected to said manually operable control means, a repeatback connection between said power motor and said second input connection, a settable device with limits in the repeatback connection having an override yielding position and a second position providing initial freedom without restraint, switching means settable in automatic pilot or manual position, and means controlled by said switching means for setting said device in the second position when the switching means is set in the manual position.

13. In a dirigible craft having a steering member, a manual booster and automatic pilot servo system including in combination, a power motor connected to operate the steering member, a manually operable control member, automatic pilot means including a servomotor, means for operating said power motor, a differential rocker providing an input to said power motor operating means, a first input connection to said differential rocker operatively connected to said automatic pilot servomotor, a second input connection to said differential rocker operatively connected to said manually operable control means, a switching device settable in automatic pilot or manual position, means for centering said first input connection, a repeatback connection from the power motor to said second input connection, settable means with limits in the repeatback connection having an override yielding position and a second position providing initial freedom without restraint, and means controlled by said switching device when set in manual position for operating said centering means and for setting said settable means in said second position.

14. A system as claimed in claim 13, including spring centering means for said manually operable control means.

15. In a dirigible craft having a steering member, a manual booster and automatic pilot servo system including in combination, a power motor connected to operate the steering member, a manually operable control member, automatic pilot means including a servomotor, means for operating said power motor, a differential rocker providing an input to said power motor operating means, a first input connection to said differential rocker operatively connected to said automatic pilot servomotor, a second input connection to said differential rocker operatively connected to said manually operable control means, a switching device settable in automatic pilot or manual position, means for centering said first input connection, a repeatback connection between the power motor and said second input connection, settable means with limits in the repeatback connection having an override yielding position and a second position providing initial freedom without restraint, means for disabling said centering means controlled by said switching device when set in the automatic pilot position, and means controlled by said switching device when set in automatic pilot position for setting said settable means in said override yielding position.

16. A system as claimed in claim 15, including spring centering means for said manually operable control member.

17. In a dirigible craft having a steering member, a manual booster and automatic pilot servo system including in combination, a power motor connected to operate the steering member, a manually operable control member, automatic pilot means including a servomotor and repeatback means providing a signal in accordance with the displacement of the steering member from a null condition, means for operating said power motor, a first input connection between said manually operable control member and said power motor operating means, a second input connection between the servomotor of said automatic pilot means and said power motor operating means, a switching device settable in automatic pilot or manual position, means for centering said second input connection, and means controlled by said switching device when set in manual position for operating said centering means and for rendering said automatic pilot repeatback means ineffective.

18. In a dirigible craft having a steering member, a manual booster and automatic pilot servo system including in combination, a power motor connected to operate the steering member, a manually operable control member, automatic pilot means including a servomotor, means for operating said power motor, a first input connection between said manually operable control member and said power motor operating means, a second input connection between the servomotor of said automatic pilot means and said power motor operating means, spring centering means for said manually operable control member, means for limiting the operation of said power motor under control of said automatic pilot means including repeatback means between said power motor and said first input connection having a spring controlled disengageable connection therein, the arrangement and relative restraints provided by said centering means and disengageable connection being such that the disengageable connection becomes disengaged to effect the desired limitation of operation of the power motor.

References Cited in the file of this patent
UNITED STATES PATENTS

| Number | Name | Date |
|---|---|---|
| 1,918,082 | Carlson | July 11, 1933 |
| 2,140,037 | Swisher | Dec. 13, 1938 |
| 2,221,748 | Alkan | Nov. 19, 1940 |
| 2,234,326 | Tiebel | Mar. 11, 1941 |
| 2,264,559 | Wood | Dec. 2, 1941 |
| 2,272,725 | Overbeke | Feb. 10, 1942 |
| 2,371,388 | Glenny | Mar. 13, 1945 |
| 2,394,384 | Horstmann | Feb. 5, 1946 |
| 2,515,475 | Shoemaker | July 18, 1950 |